United States Patent [19]
Takamatsu et al.

[11] Patent Number: 6,039,300
[45] Date of Patent: Mar. 21, 2000

[54] GAS SUPPLY VALVE FOR GAS-POWERED VEHICLE

[75] Inventors: Risuke Takamatsu, Osaka; Seiichi Kimura, Osaka-fu, both of Japan

[73] Assignee: Robert Bosch GmbH, Stuttgart, Germany

[21] Appl. No.: 09/177,598

[22] Filed: Oct. 23, 1998

[30] Foreign Application Priority Data

| Apr. 25, 1997 | [JP] | Japan | ................................ 9-122959 |
| Feb. 16, 1998 | [JP] | Japan | ................................ 10-51462 |
| Oct. 5, 1998 | [JP] | Japan | ................................ 10-282753 |

[51] Int. Cl.[7] ................................................. F16K 31/04

[52] U.S. Cl. ........................................ 251/129.12; 251/248

[58] Field of Search ..................... 251/129.11, 129.12, 251/286, 248, 144

[56] References Cited

U.S. PATENT DOCUMENTS

| 2,917,273 | 12/1959 | Best | ........................................ 251/248 |
| 2,930,571 | 3/1960 | Vogl | ................................ 251/129.12 X |
| 3,505,888 | 4/1970 | Denkowski | ..................... 251/129.11 X |

*Primary Examiner*—Kevin Lee
*Attorney, Agent, or Firm*—Edwin E. Greigg; Ronald E. Greigg

[57] ABSTRACT

A gas inlet member is fixed to a valve body and an upper part stem and a lower part stem are inserted slidably into a vertical stem opening above the gas inlet member. A valve member is provided in the gas inlet member and a gas flow passage is formed. A ring-like seal member is mounted onto the upper part stem and an O-ring is fixed to the lower part stem. A part of the valve member disposed at the lower end portion of the valve body is merely inserted into a gas container. It is possible to carry out a stable operation of the gas supply valve in spite of a change of environment due to vibration or heat while driving a vehicle.

5 Claims, 8 Drawing Sheets

GAS SUPPLY VALVE FOR GAS-POWERED VEHICLE

BACKGROUND OF THE INVENTION (1) Field of the Invention

The present invention relates to a gas supply valve for a gas-power vehicle which supplies pressure gases such as a compressed natural gas to a vehicle which is driven with a gas fuel.

(2) Prior Art

Conventionally, a gasoline car is used as one of means for transportation. In recent years, in view of protection of environment, a natural gas, which is a clean fuel in comparison with a gasoline fuel, is watched in place of a gasoline fuel and therefore a vehicle using the natural gas is improved.

The vehicle using the natural gas is provided therein with several containers in which a natural gas is filled and compressed. The natural gas filled in the gas container is supplied to an engine of a vehicle through a gas supply valve which is mounted onto an opening portion of the gas container.

On the other hand, the gas container provided with the vehicle receives a great change of environment due to vibration and heat while the vehicle is driving. However, the gas supply valve has to work in spite of a great change of environment due to vibration and heat while the vehicle is driving. Further, in the case of an unlikely event that the vehicle is troubled, it has to prevent the natural gas in the gas container from leaking, and if the vehicle is burnt down, it becomes necessary to take an operation for discharging the gas of the gas container into the air.

As the gas supply valve, it proposes such a valve mechanism which may open and close a valve member by means of a solenoid valve. However, where the solenoid valve is disposed in the gas container and operable therein, when the solenoid valve has a heat through a supply of electric current, it is in danger of igniting the natural gas due to the heat.

SUMMARY OF THE INVENTION

The present invention has an object to provide a gas supply valve for a gas-power vehicle which may display a stable efficiency in spite of a change of environment while driving the vehicle without occurrence of heat in the gas container, and surely prevent the compressed natural gas in the gas container from leaking in the case of an unlikely event that the vehicle is troubled.

The gas supply valve for a gas-power vehicle according to the present invention as claimed in claim 1, comprises a valve body having a vertical stem opening, a gas inlet member fixed to a lower end of the opening of the vertical stem opening to communicate with a gas container, an upper part stem slidably and rotatably inserted into the vertical stem opening on the upper side of the gas inlet member, a lower part stem slidably inserted into the vertical stem opening on the upper side of the gas inlet member to move up and down according to the rotation of the upper part stem, a valve member disposed in the lower portion of the gas inlet member for opening and closing the lower end of the opening of the gas inlet member with the up and down movements of the lower part stem, said valve member being urged with a spring force in a direction to close the gas inlet, a gas flow passage formed between the periphery of the lower part stem and the inner peripheral surface of the vertical stem opening to communicate the gas inlet and a gas supply passage formed in the valve body, a ring-like seal member mounted onto the lower end portion of the upper part stem to contact the inside peripheral surface of the upper portion of the vertical stem opening with the peripheral surface of the ring-like seal member under pressure, a ring-like stopper fixed to the upper opening portion of the vertical stem opening for receiving the upper end surface of the ring-like seal member with the under surface of the ring-like stopper, and an O-ring fixed to the peripheral surface of the upper end portion of the lower part stem to contact with the inside peripheral surface of the vertical stem opening under pressure for filling up a clearance between the peripheral surface of the lower part stem and the inside peripheral surface of the vertical stem opening.

Further, in the gas supply valve for a gas-power vehicle as claimed in claim 1, the gas supply valve of claim 2, further comprises multi-threaded screw means for connecting the lower end portion of the upper part stem and the upper part potion of the lower part stem, wherein the upper part stem is urged in a direction of rotation by pressing the lower part stem upwardly.

Furthermore, in the gas supply valve for a gas-power vehicle as claimed in claim 1 or 2, the gas supply valve further comprises a rotation mechanism for the upper part stem, said rotation mechanism including a spring for urging the upper part stem in a direction that the valve member closes the gas inlet of the gas inlet member, a first disc member provided with the upper end portion of the upper art stem integrally and having a hitch projection with the periphery thereof and an engaging projection with the upper surface thereof, a second disc member having an engaging projection with the lower surface thereof to engage with the engaging projection of the first disc member, a motor for driving the second disc member, a lock mechanism provided with a solenoid for disengagably engaging with the hitch projection of the first disc at the time that the gas inlet of the gas inlet member becomes in the opening state due to the down movement of the lower part stem by rotating the upper part stem against the spring with the rotation of the first disc member, a first limit switch for stopping the motor, and a second limit switch for changing a direction of rotation of the motor for driving the second disc member.

Further, a gas supply valve for a gas-power vehicle according to the present invention comprises a valve body having a vertical stem opening, a gas inlet member fixed to a lower end of the opening of the vertical stem opening to communicate with a gas container, an upper part stem slidably and rotatably inserted into the vertical stem opening on the upper side of the gas inlet member, a lower part stem slidably inserted into the vertical stem opening on the upper side of the gas inlet member to move up and down according to the rotation of the upper part stem, a valve member disposed in the lower portion of the gas inlet member for opening and closing the lower end of the opening of the gas inlet member with the up and down movements of the lower part stem, said valve member being urged with a spring force in a direction to close the gas inlet, a gas flow passage formed in the lower part stem to communicate its upper end opening with a gas supply passage formed in the valve body and communicate its lower opening with the gas inlet as the lower part stem moves down, a ring-like seal member mounted onto the lower end portion of the upper part stem to contact the inside peripheral surface of the upper portion of the vertical stem opening with the peripheral surface of the ring-like seal member under pressure, a ring-like stopper fixed to the upper opening portion of the vertical stem opening for receiving the upper end surface of the ring-like seal member with the under surface of the ring-like stopper.
Functions In the state that the valve body is mounted onto a gas container, when the upper part stem inserted in the vertical stem opening of the valve body rotates, the valve member opens the gas inlet against the spring force with the movement of the lower part stem.

Then, it becomes such a state that the gas inlet is communicated with the gas supply passage via the gas flow passage, and the gas in the gas container is supplied to the gas supply passage through the gas flow passage and the gas supplied to the gas supply passage is then supplied to an engine of the gas-power vehicle.

Since, the O-ring is fixed to the peripheral surface of the upper end portion of the lower part stem to contact with the inside peripheral surface of the vertical stem opening under pressure for filling up a clearance between the peripheral surface of the lower part stem and the inside peripheral surface of the vertical stem opening, the gas flown from the gas inlet never leak towards the upper side of the O-ring inadvertently.

Further, the lower part stem is urged upwardly by receiving the resistant force of the spring due to the opening movement of the valve member for the gas inlet against the spring force. The upper part stem is also urged upwardly by urging the lower part stem upwardly, and then the ring-like seal member, which is mounted onto the lower end portion of the upper part stem to slidably contact the periphery of the seal member with the inside peripheral surface of the upper end portion of the vertical stem opening, keeps such a state that the upper end surface of the ring-like seal member is received under pressure by the under surface of the ring-like stopper which is fixed to the upper opening portion of the vertical stem opening. With the contact of the ring-like seal member and the ring-like stopper under pressure, it may surely prevent that the gas, which is flown from the gas inlet and filled in the vertical stem opening, leaks outside from the vertical stem opening of the valve body.

As the upper part stem rotates in an opposite direction with respect to the above mentioned direction, the lower part stem moves upwardly so that the valve member moves upwardly together with the lower part stem to close the gas inlet and surely prevent the flow of the gas from the gas container.

The open and close actions of the valve member is carried out with the rotation of the upper part stem, and its rotation mechanism is as defined in claim 3. The motor rotates the second disc member. At the time, the engaging projection projecting from the under surface of the second disc member, is engaged with the engaging projection from the rear thereof, which projection is projecting from the upper surface of the first disc member which is mounted on the upper end portion of the upper part stem integrally. Therefore, the rotation force of the second disc member may be transmitted to the first disc member so as to rotate the first disc member.

The upper part stem rotates with the rotation of the first disc member, and with the rotation of the upper part stem the lower part stem moves downwardly so as to open the gas inlet and supply the gas in the gas container to the engine of the gas-power vehicle.

At the time that the upper part stem rotates in a state that the valve member opens the gas inlet completely, the limit switch pressing member integrally with the second disc member presses the second limit switch. Then, the lock mechanism operates and hitches the hitch member of the first disc member disengagably and fixes the lower part stem in its rotation position against the spring force, so as to keep the gas inlet in its opening state by means of the valve member, and at the same time the motor reverses the direction of its rotation so as to reverse the second disc member.

At the time that the second disc member returns its original position by reversing the rotation thereof, the limit switch pressing member presses the first limit switch so as to stop the motor and the second disc member stands ready in its original position.

On the other hand, when stopping the vehicle, the gear of the motor rotates so as to rotate the second disc member engaging with the gear. And, the second disc member rotates for a predetermined angle so as to shift its engaging projection rearwardly of the engaging projection of the first disc member for waiting the next step, and its limit switch pressing member presses the second limit switch.

Then, a signal issues from the second limit switch to the lock mechanism so that the solenoid becomes in a non-current state, and the engagement between the lock mechanism and the hitch projection of the first disc member is released and disengaged. As the result, with the spring force, the first disc member is rotated slightly together with the upper part stem in a direction of closing the gas inlet by means of the valve member, and its engaging projection becomes in an engaging state to engage with the engaging projection of the second disc member.

Simultaneously, the second limit switch issues a signal to the motor and reverses the motor to reverse the rotation of the second disc member. The first disc member rotates together with the second disc member integrally while keeping the engaging state of its engaging projection with the engaging projection of the second disc member and then returns to its original state. The upper part stem rotates according to the rotation of the first disc member so as to move the lower part stem upwardly so that the gas inlet may be closed by the valve member.

When a current is shut off in emergency cases such as a traffic accident, the solenoid becomes in a state of non-current so that the lock mechanism moves away from the first disc member, and the upper part stem having the first disc member rotates in an opposite direction of the above mentioned direction with the spring force so as to move the lower part stem upwardly and then the gas inlet is closed by means of the valve member. At the time, where the first disc member rotates together with the upper part stem integrally, the rotation force is never transmitted to the second disc member since the engaging projection of the second disc member stands in a position that is remote away from the engaging projection of the first disc member. Therefore, the first disc member rotates instantaneously together with the upper part stem with the spring force without influence of load of the motor for rotating the second dismember, so as to lift the lower part stem and then the gas inlet is closed by means of the valve member.
Advantages According to the gas supply valve for a gas-power vehicle of this invention, since the gas inlet, which is provided with the lower end of the valve body, is opened and closed by the valve member to move the lower part stem up and down with the rotation of the upper part stem which is disposed in the valve body, only the valve portion, which is provided with the lower end portion of the valve body, is inserted into the gas container, so that the gas supply valve may work stably in spite of change of environment due to vibration or heat while driving the vehicle.

Since the ring-like seal member is mounted to the lower end portion of the upper part stem and the periphery of the ring-like seal member is contacted with the inside periphery of the upper end portion of the vertical stem opening under pressure and at the same time the upper end surface of the seal member is received by the under surface of the ring-like stopper fixed to the upper opening of the vertical stem opening, the lower portion lower than the ring-like seal member, is shut off and airtight with respect to the outside of the valve body by means of the ring-like seal member, so that the gas may not leak easily or inadvertently towards the outside of the valve body.

Further since the O-ring is fixed to the periphery of the upper end portion of the lower part stem to contact with the inside periphery of the vertical stem opening under pressure so as to fill up the clearance between the periphery of the lower part stem and the inside periphery of the vertical stem opening, the gas flown from the gas container flows into the upper portion upper than the upper end portion of the lower part stem, namely the threaded portions of the upper part stem and the lower part stem, and as the result, it may prevent an unexpected situation that the forward and rearward screw movements of the lower part stem with respect to the upper part stem is prevented with the resistant force of the compressed flown gas. Therefore, the smooth shift of the lower part stem with respect to the upper part stem in up and down directions may be held always and then the opening and closing operations of the gas inlet by means of the valve member may always be stable and sure.

The invention as claimed in claim 2, defines the threaded construction between the upper part stem and the lower part stem, and according to this invention, the rotation of the upper part stem may be assisted by pressing the lower part stem upwardly with the compressed gas of the gas container, so as to smoothly carry out the rotation of the upper part stem. Therefore, the closing operation of the gas inlet by means of the valve member may be rapid and sure, particularly in an emergent situation.

The invention as claimed in claim 3, defines an automatic operating mechanism of the upper part stem for opening and closing the valve member, and according to this invention, the first disc member and the second disc member are rotated integrally so as to move the lower part stem downwardly and open the gas inlet by means of the valve member so that the gas in the gas container may be supplied to the engine.

Further, where the upper part stem rotates until the valve member opens the gas inlet completely, the hitch projection of the first disc member hitches the lock mechanism so as to fix the upper part stem in its rotation position against the spring force, and then the gas inlet may be maintained in its opening state by means of the valve member.

When the opening state of the gas inlet by means of the valve member turns to its closing state, the motor controls the rotation of the first disc member, so as to control a rapid rotation and returning due to the spring which is integral with the first disc member, and since the upper part stem may be rotated gently and returns to its original position with the control of the motor, it does not give a strain force to the members comprising the gas supply valve for a gas-power vehicle and further it does not almost occur vibration in the opening and closing operations of the gas inlet by means of the valve member, so that no bad influence may be given with respect to other machines or devices which are disposed in the vehicle.

Where the vehicle stops or a electric current is shut off in an emergency, the lock mechanism may be released to rotate the upper part stem having the first disc member with spring force in the direction opposite to the above mentioned direction so as to move the lower part stem upwardly, so that the gas inlet may be closed by means of the valve member as mentioned above. At the time, if the first disc member rotates together with the upper part stem integrally in a counterclockwise direction, since the engaging projection of the second disc member stands in a position remote away from the engaging projection of the first disc member, the rotation force of the first disc member could not be transmitted at all to the second disc member. As the result, the first disc member rotates instantaneously together with the upper part stem with the spring force in a counterclockwise direction so as to move the lower part stem upwardly, so that the gas inlet may be closed rapidly and surely by means of the valve member.

BRIEF DESCRIPTION OF THE DRAWINGS

The drawings show an embodiment of this invention in which.

DETAILED DESCRIPTION OF THE PREFERRED EMBODIMENTS

Figure 1:
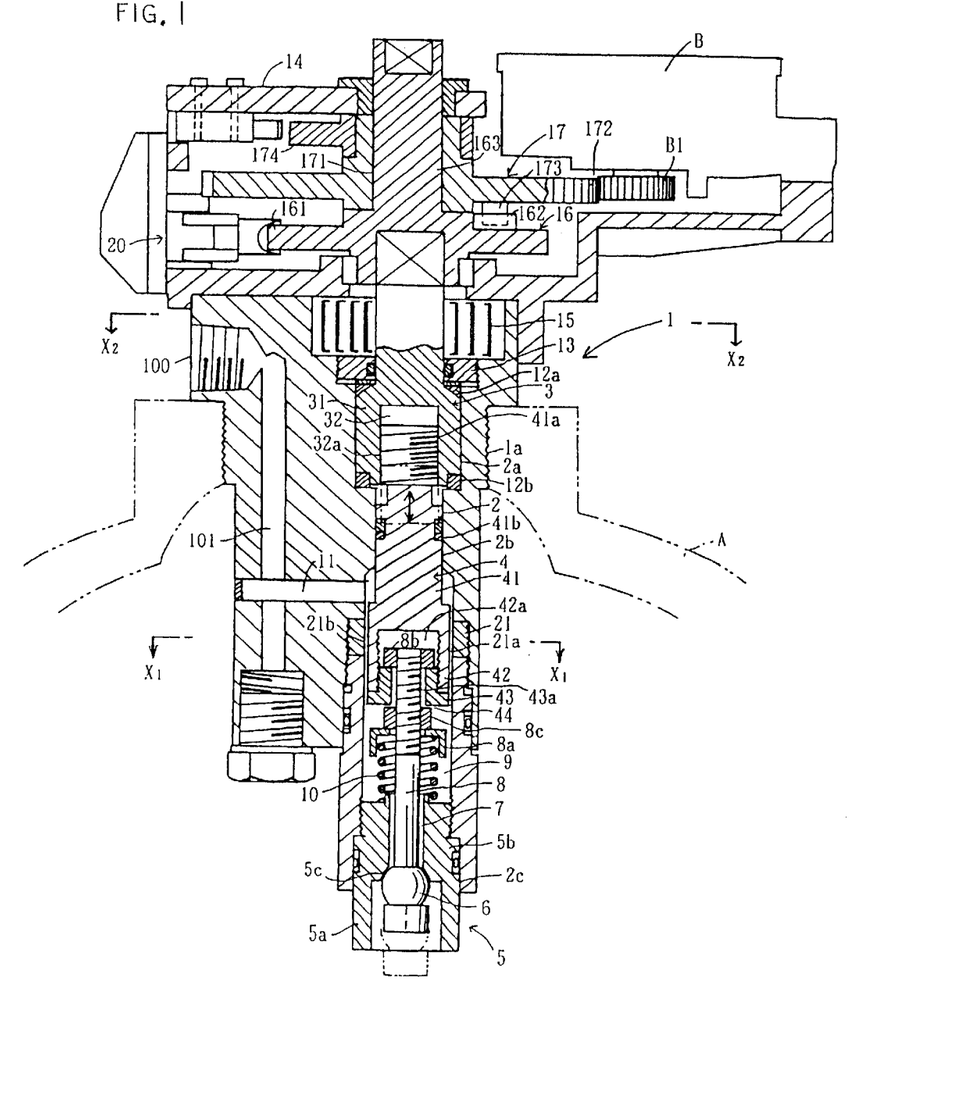
FIG. 1 is a vertical sectional front view of whole of the valve body.

The practical form of this invention will be described with reference to the drawings. 1 is a valve body of metal and the periphery of the central portion thereof is provided with a threaded portion 1a to which a glass container A is attached detectably, and in the valve body a vertical stem opening 2 is provided to penetrate between the upper and lower end surfaces thereof. The upper portion of the vertical stem opening 2 is formed to have a diameter slightly greater than that of the lower portion thereof, and an upper stem portion 3 of metal is inserted into an upper portion opening 2a of the vertical stem opening 2, and a lower stem portion 4 of metal is inserted into a lower portion opening 2b of the vertical stem opening 2 to be slidable in up and down directions, but not rotatable.

A gas inlet member 5 is screwed onto a lower opening portion 2c of the lower portion opening 2a of the vertical stem opening 2, and a gas inet space 9 is formed between the gas inlet member 5 and the lower surface of the lower stem portion 4. The gas inlet member 5 is integrally provided with a cylindrical lower half portion 5a in which a valve body 6, is provided to be displaceable in up and down directions, and also integrally provided with a bush-like upper half portion 5b which is screwed onto the inside periphery of the lower end opening of the lower portion opening 2b of the valve body. A gas inlet 7 of small diameter penetrates a central portion of the bush-like upper half portion 5b in up and down direction. A valve seat 5c is formed with the periphery of the lower opening of the gas inlet 7, and an upper half globular periphery of the valve member 6 is detectably contacted with the valve seat 5c under pressure so as to open and close the gas inlet 7.

The valve member 6 is formed to be globular and the upper half periphery of the globular body thereof is contacted with the valve seat 5c of the bush-like upper half portion 5b of the gas inlet member 5 by metal to metal contact, so as to open and close the lower opening portion of the gas inlet 7.

On the other hand, in the operation of filling up a container A with a gas from a gas filling opening 100, which is referred to hereinafter, the container A and the valve body 1 is cooled with adiabatic change of the gas, and after filling the container A with the gas under pressure, the temperature of the gas goes up as its kinetic energy is lost, so that the container A and the valve body 1 is heated again. Thus, with the filling operation of the gas for the container A, the container A and the valve body 1 receives repetition of cooling and heating operations. As mentioned above, since the lower end opening of the gas inlet 7 can be opened and closed by contacting the upper half globular periphery of the valve member 6 with the valve seat 5c by metal to metal touch without provision of an elastic member such as rubber between the upper half globular periphery of the valve member 6 and the valve seat 5c, opening and closing of the lower end opening of the gas inlet 7 by means of the valve member 6 can be always carried out surely and stably without problem of deterioration due to cooling or heating caused in the elastic member.

A cylinderical connecting member 8 of long size, having a diameter smaller than that of the gas inlet 7, is inserted into the gas inlet 7, and the lower end portion of the cylinderical connecting member 8 is embedded in and fixed to a central portion of the upper half globular periphery of the valve member 6, and the upper end portion of the member 8 is connected to the lower end portion of the lower part stem 4. The valve member 6 and the lower part stem 4 are connected to each other via the cylinderical connecting member 8, so as to move up and down directions integrally. Now, the connecting construction of the cylinderical connecting member 8 and the lower part stem 4 will be described in detail. A cylindrical space portion 42a is formed with the lower end portion of the lower part stem 4 to open the lower end surface thereof. A hanging support member 43 is screwed integrally onto the lower end opening portion of the cylindrical space portion 42a. A penetrating opening 43a, which has a diameter greater than that of the cylinderical connecting member 8, but smaller than that of the cylindrical space portion 42a, penetrates the central portion of the hanging support member 43 in up and down directions. The upper end portion of the cylinderical connecting member 8 is inserted into the penetrating opening 43a of the hanging support member 43 and then a large diameter head portion 8b, which has a diameter smaller than that of the cylindrical space portion 42a, but greater than that of the penetrating opening 43a, is provided integrally in the penetrating opening 43a of the hanging support member 43. The cylinderical connecting member 8 and lower part stem 4 are connected to each other via the cylinderical connecting member 8 by engaging the large diameter head portion 8b with the upper end opening surface of the penetrating opening 43a in the cylindrical space portion 42a.

A stopper 8a having a diameter smaller than that of the lower portion opening 2b, is provided integrally with the upper portion of the cylinderical connecting member 8 between the upper end surface of the gas inlet member 5 and the lower surface of the hanging support member 43. A spring 10 is disposed under pressure between the lower surface of the stopper 8a and the upper end surface of the gas inlet member 5, and a fixing member 8c for fixing the stopper 8a and the cylinderical connecting member 8, is fixed to the upper surface of the stopper 8a. In the state that the valve member 6 is contacted with the valve seat 5c with a force of the spring 10, a clearance 44 is formed between the fixing member 8c and the hanging support member 43. In other words, when the spring 10 expands maximum, the valve member 6 keeps its position to close the gas inlet 7 with the force of the spring 10, and it brings about such a state that the lower surface of the hanging support member 43 is remote away from the upper surface of the fixing member 8c.

Figure 2:
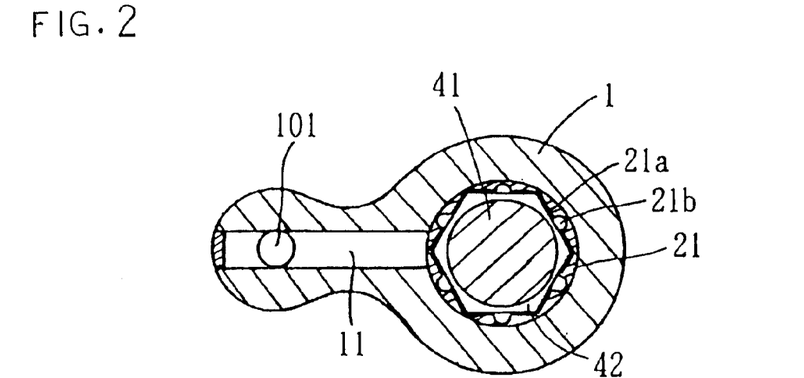
FIG. 2 is a sectional view taken along lines $X_1$—$X_1$ in FIG. 1.

An upper half portion of the lower part stem 4 is formed to be a small diameter stem portion 41 and its lower half portion is formed to be a hexagonal shaft portion 42 which is a size larger than the small diameter stem portion 41, and on the other hand, a co-rotation block member 21 is screwed integrally onto a central portion in the lower portion opening 2b of the vertical stem opening 2. A penetrating opening 21a is formed to penetrate in the co-rotation block member 21, in up and down directions and to accord with a shape of plan view of the hexagonal shaft portion 42 of the lower part stem 3. The hexagonal shaft portion 42 of the lower part stem 3 is inserted into the penetrating opening 21a to be slidable in the up and down directions, but not rotatable. A plurality of gas flow passages 21b are formed to penetrate in the inside periphery of the co-rotation block member 21 in the up and down directions, leaving a constant distance therebetween (See FIG, 2). The gas inlet 7 is always communicated with the gas supply passage 11 which is disposed at the side of the valve body 1 through the gas flow passages 21b.

A lower half portion of the upper part stem 3 is formed to be a large diameter portion 31, having a diameter greater than that of the upper half portion thereof, and a center hole 32 is formed at a center of the large diameter portion 31 to open with the under surface thereof and a female screw portion 32 is formed with the inside periphery of the center hole 32. The upper end portion of the small diameter shaft portion 41 of the lower part stem 4 is inserted into the center hole 32 and a male screw portion 41a formed with the periphery of the small diameter shift portion 41, is screwed onto the female screw portion 32a, so that the lower part stem 4 is formed to be slidable in up and down direction in the lower part opening 2b, but not rotatable with rotation of the upper part stem 3.

Now, the threaded construction between the upper part stem 3 and the lower part stem 4 will be described in detail. The female screw portion 32a of the upper part stem 3 and the male screw 41a of the lower part stem 4 are formed to be a trapezoid screw and to have multi-threads, and a lead angle of each of the female screw portion 32a of the upper part stem 3 and the male screw 41a of the lower part stem 4, is formed to be greater than a friction angle of the screw surface thereof. Thus, the threaded engagement between the upper part stem 3 and the lower part stem 4 is so constructed that the engagement tends to be loose. Therefore, when the lower part stem 4 moves upwards, namely, in a direction of going up towards the upper part stem 3, it is possible to urge the upper part stem 3 in a direction of rotation by means of the multi-threaded male and female screw portions 41a and 32a.

The O-ring 41b is fixed onto the periphery of the upper end of the lower part stem 4, so as to fill up the clearance between the periphery of the upper end of the lower part stem 4 and the inside periphery of the lower part opening 2b of the vertical stem opening 2 which faces the periphery of the upper end of the lower part stem 4. Therefore, the gas flowing into the vertical stem opening 2 from the gas inlet 7, does not flow into or stay in the threaded portion between the upper part stem 3 and the lower part stem 4, namely the space which is positioned higher than the upper end surface of the lower part stem 4 in the central hole 32 of the upper part stem 3, and as the result, it does not happen to occur such an unexpected situation that the lower part stem 4 screws and progresses upwardly in the central hole 32 of the upper part stem 3 with a resistant force against the compressed gas which is flown into the vertical stem opening 2. Accordingly, it becomes possible to smoothly carry out that the lower part stem 4 progresses upwardly with screw function.

Upper and lower ring-like seal members 12a and 12b are mounted onto each of the peripheries of the upper and lower ends of the large diameter portion 31 of the upper part stem 3. The upper end surface of the upper ring-like seal member 12a is contacted with, under pressure, and received by the lower surface of a ring-like stopper 13 which is fixed to the upper opening portion of the upper part opening 2a above the large diameter portion 31 of the upper part 3. The periphery of the upper ring-like seal member 12a is contacted with the inside periphery of the upper part opening 2a, under pressure. The lower ring-like seal member 12b is contacted with and received by the end surface of the upper end opening of the lower part opening 2b. The upper stem portion of the upper part stem 3 is made to project in the lower portion of a box 14 which is fixed to the upper end surface of the valve body 1 integrally.

Figure 3:
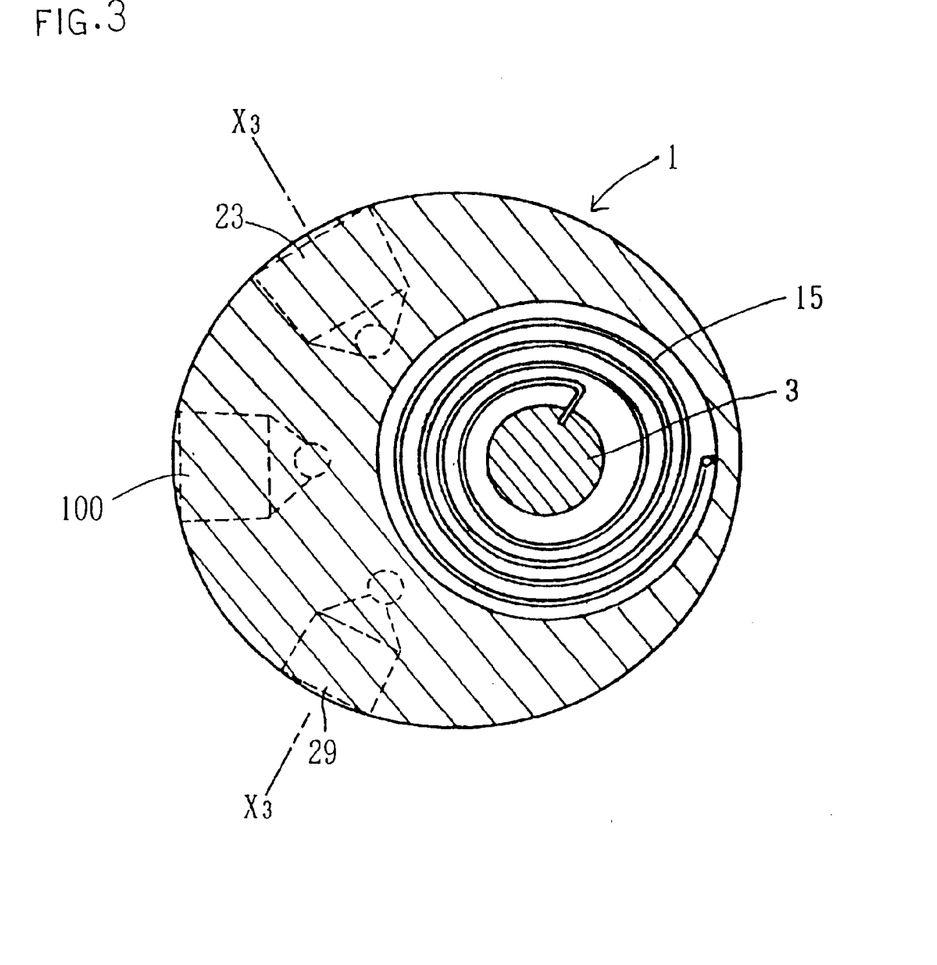
FIG. 3 is a sectional view taken along lines $X_2$—$X_2$ in FIG. 1.
Figure 4:
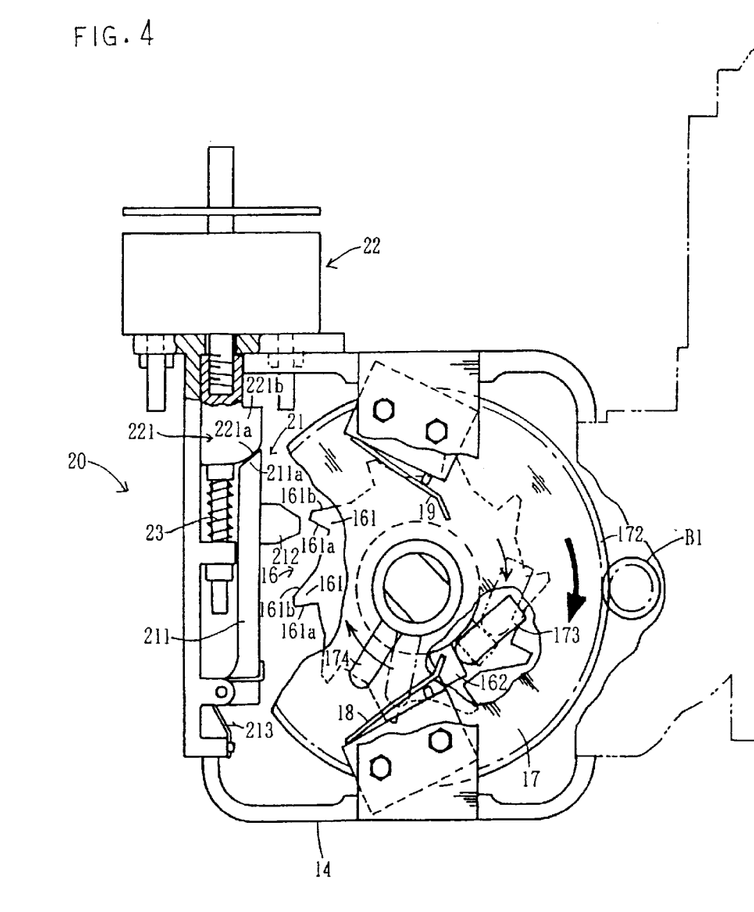
FIG. 4 is a brief plan view showing a rotation mechanism of an upper part stem sectioning a part of thereof.

An end of a spiral spring 15, which is wound around the periphery of the upper part stem 3, is fixed to the upper part stem 3 between the upper surface of the ring-like stopper 13 and the outside bottom surface of the box 14, as shown in FIG. 3. The other end of the spiral spring 15 is fixed to the valve body 1 and with the righting moment of the spiral spring 15, the upper part stem 3 is always urged in a direction to close the gas inlet 7 by the valve member 6, namely to lift up the lower part stem 4. The center of the first disc member 16, which is disposed on the inside bottom portion of the box 14, is fixed to the upper end portion of the upper part stem 3, integrally. As shown in FIG. 4, a plurality of hitching projections 161, having the same figure, are made to project from the periphery of the first disc member 16, leaving a constant distance therebetween. Each of the hitching projections is formed to be a right-angled triangle in plan view, and its rear surface is formed to be a hitching surface 161a which may hitch a lock mechanism 20 which is referred to hereinafter, and its front surface is formed to be an inclined tip surface 161b which inclines rearwardly. And, an engaging projection 162 is made to project upwardly from the periphery of the upper surface of the first disc member 16.

Further, a second disc member 17 is disposed in the box 14 on the upside of the first disc member 16. A penetrating opening 171 penetrates a central portion of the second disc member in up and down directions. A central shaft 163 projecting upwardly from a center of the upper surface of the first disc member 16, is inserted rotatably into the penetrating opening 171.

The periphery of the second disc member 17 is cut to form a gear 172 which engages with a gear B1 of the motor B, so that the second disc member 17 may rotate with rotation of the gear B1 of the motor B. An engaging member 173 is made to project downwardly from the under surface of the second disc member 17, so as to engage with the engaging projection 162 of the first disc member 16, and the engaging member 173 is engaging the rear surface of the engaging projection 162 of the first disc member 16, with its front surface, in such a state that the gas inlet 7 is closed by the valve member 6. A limit switch pressing member 174 is made to project laterally from the upper portion of the second disc member 17, so as to press a first limit switch 18 and a second limit switch 19, which are disposed in a rotational orbit of the limit switch pressing member 174, which will be referred to hereinafter.

The second disc member 17, engaging the gear B1, is rotated by rotating the gear B1 with operation of the motor B, and with the engagement between the engaging member 173 of the second disc member 17 and the engaging projection 162 of the first disc member 16, the rotational force of the second disc member 17 may be transmitted to the first disc member 16. As the result, the lower part stem 4 can be moved downwardly by rotating the first disc member 16 against the spiral spring 15 so as to close the gas inlet 7 completely. And, the hitching projection 161 of the first disc member 16 is hitched by the lock mechanism 20, which will be referred to hereinafter, in order to maintain an opening state of the gas inlet 7 by keeping a rotational position of the upper part stem 3.

The lock mechanism 20 comprises a movable lock member 21 and a solenoid 22, and the movable lock member 21 pivots a base end portion of a lever 211, the rip surface of which is formed to be an inclined end surface 211a, to the box 14 so as to rotate towards the first disc member 16. The lever 211 is urged by a spring 213 in a direction to remote away from the hitching member 161 of the first disc member 16. An engaging member 212 is made to project from a center of the lever 211 towards the first disc member 16, so that the front surface of the engaging member 212 may be engaged with the hitching surface 161a of the hitching projection 161 of the first disc member 16.

The solenoid 22 provides an operation rod 221 having a head portion 221b which projects towards the lever 211 against the spring pressure of the spring 23, at the time of currency of electricity, so as to rotate the lever 211 towards the first disc member 16 while sliding the inclined end surface 221a on the inclined end surface 211a of the lever 211. With the rotation of the lever 211, the engaging member 212 is engaged with the hitching surface 161a of the hitching projection 161 of the first disc member. At the time of non-currency of electricity, the operation rod 221 is moved rearwards with the spring 23 so as to release the engagement with the lever 211 and move the engaging member 212 of the lever 211 away from the hitching projection 161 of the first disc member 16.

The first limit switch 18 and the second limit switch 19 are disposed on the side wall of the box 14. In detail, the second limit switch 19 is arranged in the rotational orbit of the limit switch pressing member 174 of the second disc member 17 and also arranged in a rotational position of the limit switch pressing member 174 of the second disc member 17, where the hitching surface 161a of the hitching projection 161 of the first disc member hitches the engaging member 212 of the lever 211 of the lock mechanism 20 at the time of completion of opening of the gas inlet 7 by the valve member 6.

The second limit switch 19 conducts the solenoid 22 of the lock mechanism 20 electrically with the press by the limit switch pressing member 174 of the second disc member 17, so as to make the operation rod 221 project and engage the engaging member 212 of the lever 211 with the hitching surface 161a of the hitching projection 161 of the first disc member 16, and transmit an electrical signal to the motor B so as to reverse the rotation of the gear B1 of the motor B.

The first limit switch 18 is arranged in a rotational orbit of the limit switch pressing member 17 of the second disc member, and also arranged in a waiting position of the limit switch pressing member 174 of the second disc member 17 in a state that the gas inlet 7 is closed by the valve member 6. The first limit switch 18 transmits an electrical signal to the motor B with the press by the limit switch pressing member 174 of the second disc member 17, the rotation of which is reversed by the second limit switch 19, so as to stop the motor B and the rotation of the second disc member 17.

The numeral 100 is a gas supply opening which opens with the periphery of the valve body which projects from the gas container A. The gas supply opening 100 is communicated with the gas supply passage 11 through a middle passage 101 which is disposed in the valve body 1.

Figure 5:
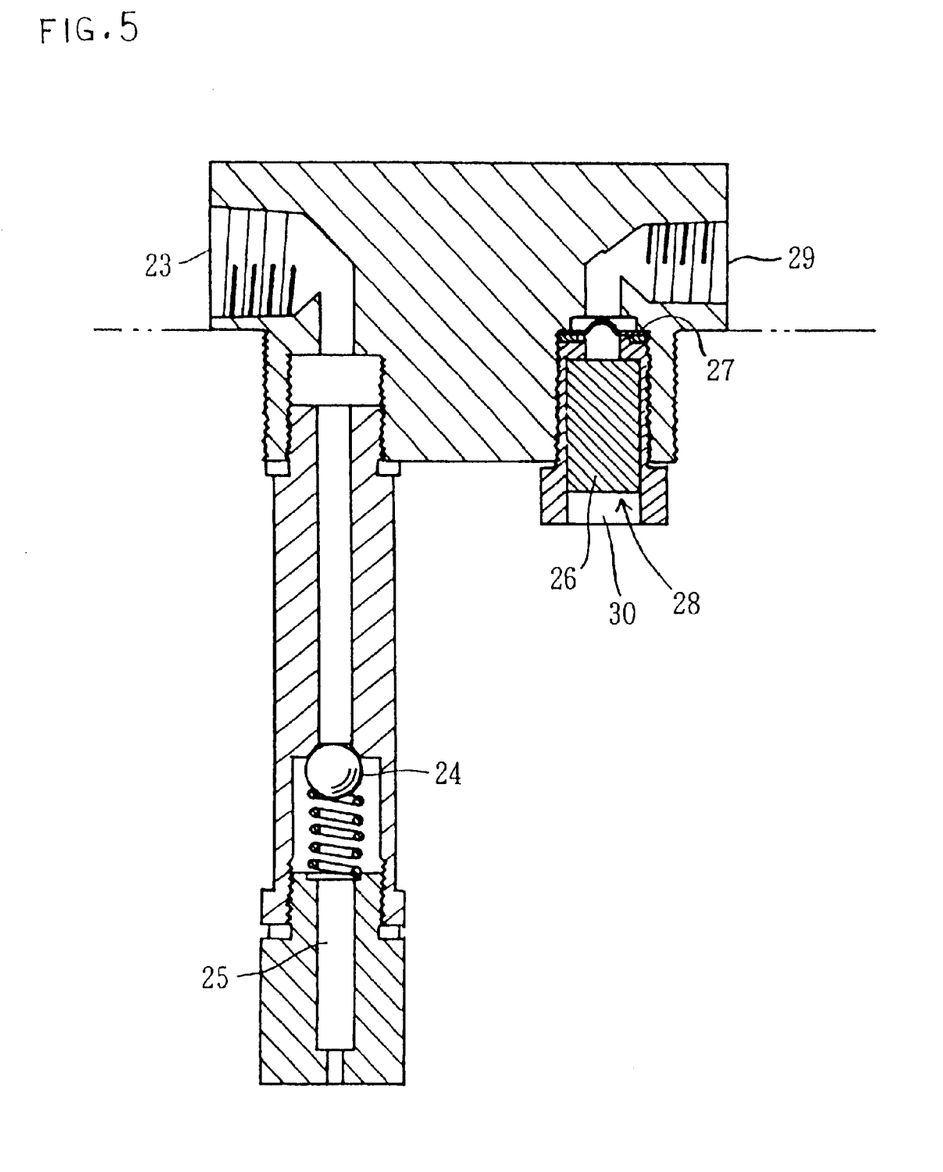
FIG. 5 is a vertical sectional view taken along lines $X_3$—$X_3$ in FIG. 3.

Further, as shown in FIG. 5, a gas filling opening 23 is opened with the upper portion of the valve body 1. The gas filling opening 23 communicates the opening lower end of the filling passage 25 with the gas container A through the filling passage 25 in which a check valve 24 is disposed to open to a direction for filling the gas. A fusible alloy 26, which is fused at a predetermined temperature, and a break plate 27 which may be broken under a predetermined pressure, are embedded in the upper portion of the valve body 1. Gas escaping passages 29 and 30 are formed with a chamber in which the fusible alloy 27 an d the break plate 27 are embedded, to be communicated with the outside of the gas container A and the inside of thereof, respectively.

The gas supply valve for a gas-power vehicle, as constructed above, is attached to the gas container A which is mounted on to the vehicle and filled up with the gas, in such a state that the lower half portion of the gas supply valve projects into the container A by screwing a screw hole, which is formed with a suitable portion of the the container A, with the screw portion 1a of the valve body 1. The gas of the gas container A is supplied to an engine by opening the gas supply valve for the gas-power vehicle in such a state that a gas supply pipe (not shown in the drawings) communicating with the engine, is connected to and communicated with the gas supply opening 100.

Figure 6:
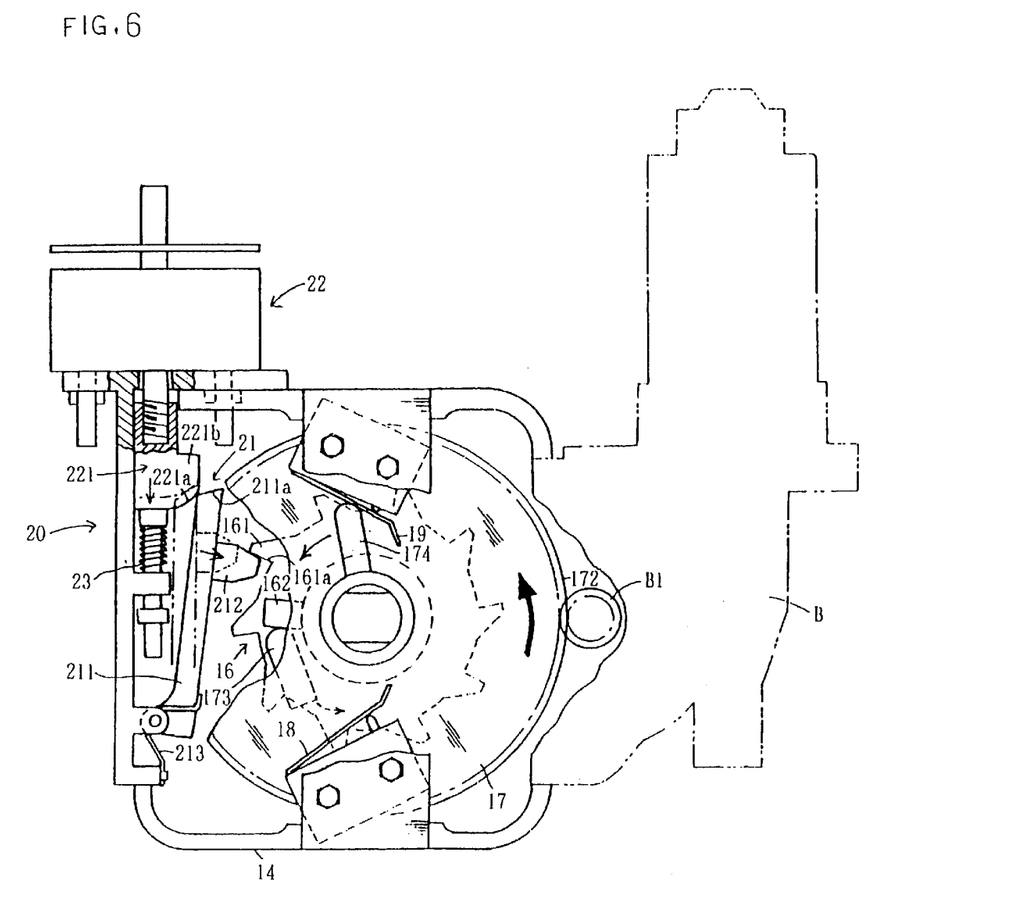
FIG. 6 is a brief plan view showing the rotation mechanism of the upper part stem sectioning a part of thereof.

When an electric source is turned on at the time of starting the vehicle, the motor B works and rotates the gear B1 of the motor B Then, the second disc member 17 gearing the gear B1, rotates in a clockwise direction, as shown in FIG. 4, so as to rotate the engaging member 173, which projects from the under surface of the second disc member 17, to reach a position near the engaging member 212 of the lever 211 as shown in FIG. 6, from a position as shown with a phantom line in FIG. 4. At the time, as mentioned above, the engaging member 173 projecting from the under surface of the second disc member 17, hitches the rear surface of the engaging projection 162 of the first disc member 16, and the first disc member 16 rotates together with the second disc member 17 to the above-mentioned position and then its rotational force is transmitted to the upper part stem 3 which is fixed to the first disc member 16, so that the upper part stem 3 may be rotated in a clockwise direction against the spiral spring 15.

When the upper part stem 3 rotates, the lower part stem 4, the male screw portion 41a of which is screwed onto the female screw portion 32a of the upper part stem 3, is moved down, and the lower surface of the hanging support member 43 of the lower part stem 4 contacts instantenuously the fixing member 8c which is fixed to the upper surface of the stopper 8a of the cylindrical connecting member 8, so as to move the cylindrical connecting member 8 down against the spring 10. With the down-movement of the cylindrical connecting member 8, the valve member 6 which is fixed to the lower end of the cylindrical connecting member is then moved down to open the gas inlet 7 so as to communicate the gas container A with the gas supply passage 11 via the gas flow passages 21b, 21b . . . . Therefore, after the pressure gas in the gas container A flows into the gas inlet 7, it passes through the gas supply passage 11 via the gas inlet space 9 and the gas flow passage 21b, so that the gas may be supplied to an engine through the gas supply pipe from the gas supply opening 100.

Thus, as the upper part stem 3 rotates until the valve member 6 moves down and opens the gas inlet 7, the limit switch pressing member 174 of the second disc member 17 reaches a position of the second limit switch 19 and presses the second limit switch 19.

Then, the second limit switch 19 transmits a signal to the solenoid 22 so as to conduct the solenoid 22 and its operation rod 221 projects against the pressure of the spring 23, so as to rotate the lever 211 towards the first disc member 16 against the spring 213 while sliding the inclined end surface 221a of the head portion 221b on the tip inclined end surface 211a of the lever 211, so that the engaging member 212 projecting towards the first disc member 16 from the lever 211, may be positioned in a rotational orbit of the hitching projection 161 of the first disc member 16.

Further, the second limit switch 19 also transmits a signal to the motor B and the motor B turns its direction of rotation of the gear B1, and then reverses the direction of rotation of the second disc member 17 engaging the gear B1.

Then, since the first disc member 16 is urged in an opposite direction with the spiral spring 15 which is fixed to the upper end portion of the upper part stem 3 to which the first disc member 16 is fixed, the first disc member 16 starts to rotate in the opposite direction together with the second disc member 17 in such a state that the rear surface of the engaging projection 162 of the first disc member 16 contacts the front surface of the engaging member 173 of the second disc member 17. However, as mentioned above, since the engaging member 212 of the lever 211 of the lock mechanism 20 is positioned in a rotational orbit of the hitching projection 161 of the first disc member 16, when the first disc member 16 rotates slightly in an opposite direction, the hitching surface 161a of the hitching projection 161 of the first disc member 16 hitches the hitching member 212 of the lever 211 and the first disc member 16 is maintained in an engaging state in its rotational position against the spiral spring 15, so that the gas inlet 7 is kept in its opening state by the valve member 6.

On the other hand, the second disc member 17 continues to rotate in an opposite or reverse by means of the gear B1 of the motor B and when the second disc member 17 returns in its original position, the limit switch pressing member 174 presses the first limit switch 18. Then, a signal is transmitted from the first limit switch 18 to stop the motor B, and the second disc member 17 engaging the gear B1 of the the motor B stands in its position for the next action of closing the valve member (See FIG. 7).

In a state that the valve member 6 opens the gas inlet 7, the upper part stem 3 is lifted up via the lower part stem 4 and the female and male screws 41a and 32a of multi-threaded, by means of the spring 10 which is disposed, under pressure, the opposite faces of the stopper 8a of the cylindrical connecting member 8 and the gas inlet member 5. Therefore, the ring-like seal member 12a, which is mounted onto the upper end portion of the large diameter portion 31 of the upper part stem 3, is in a state that the upper surface of the ring-like seal member contacts the under surface of the ring-like stopper 13 under pressure. Accordingly, the lower portion of the large diameter portion 31 of the upper part stem 3 is shut off in airtightness by means of the ring-like seal member 12a and therefore it may surely and completely prevent to occur such a state that the gas, which goes into the clearance between the periphery of each of the upper and lower part stems 3 and 4 and the inside periphery of each of the upper and lower openings 2a and 2b, leaks outside the valve body 1 inadvertently. As the result, it may prevent to occur an unexpected situation such as explosion due to the leaked gas. The ring-like seal member 12b is also attached to the lower end portion of the large diameter portion 31 of the upper part stem 3, and in cooperation with the ring-like seal member 12a attached to the upper portion of the large diameter portion 31, this seal member 12b surely and completely prevents the gas from leaking to the outside of the valve body 1 inadvertently, which gas is flown in the clearance between the peripheries of the upper and lower part stems 3 and 4 and the inside peripheries of the upper and lower openings 2a and 2b. By the way, the ring-like seal members 12a and 12b attached to the upper and lower end portions of the upper and lower part stems 3 and 4, are made of materials superior in smoothness such as polytetrafluorethylene, so as to reduce a rotational resistance of the upper part stem 3 and rotate the stem smoothly.

Furthermore, since the O-ring is fixed to the periphery of the upper portion of the lower part stem 4 to contact the inside periphery of the lower portion opening 2b of the vertical stem opening 2 under pressure, the O-ring may surely and completely prevent the gas, which goes into the clearance between the periphery of the lower part stem 4 and the inside periphery of the lower part opening 2b, from leaking to the outside of the valve body 1 inadvertently in cooperation with the ring-like seal members 12a and 12b.

Figure 7:
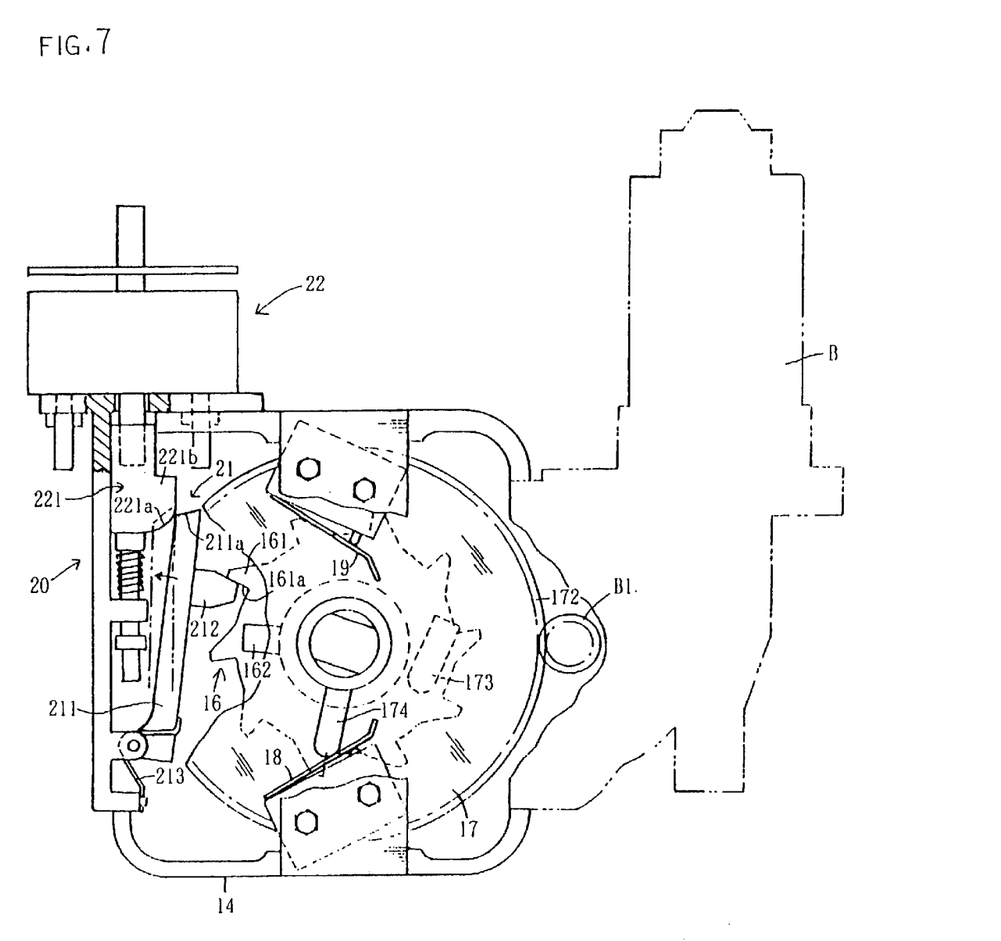
FIG. 7 is a brief plan view showing the rotation mechanism of the upper part stem sectioning a part of thereof.

Next, when stopping the vehicle and turning off the electric source, the gear B1 of the motor B rotates and the second disc member 17 that engaging the gear B1 is rotated in a direction of clockwise, as shown in FIG. 7. After the second disc member 17 rotates a predetermined angle, the limit switch pressing member 174 of the second disc member 17 presses the second limit switch 19. In this state, the engaging member 173 of the second disc member 17 reaches a waiting position rearwardly of the engaging projection 162 of the first disc member 16.

Then, as mentioned above, when the limit switch pressing member 174 of the second disc member 17 presses the second limit switch 19, the second limit switch transmits a signal to the lock mechanism 20 so as to make the solenoid 22 of the lock mechanism 22 in a non-current state. The operation rod 221 is moved rearwardly with the pressure of the spring 23 and the head 221b is moved away from the lever 211, so that the lever 211 may be rotated with the spring 213 in a direction of inwards of the box 14, namely a direction that the engaging member 212 moves away from the hitching projection 161 of the first disc member 16 (See FIG. 8).

Figure 8:
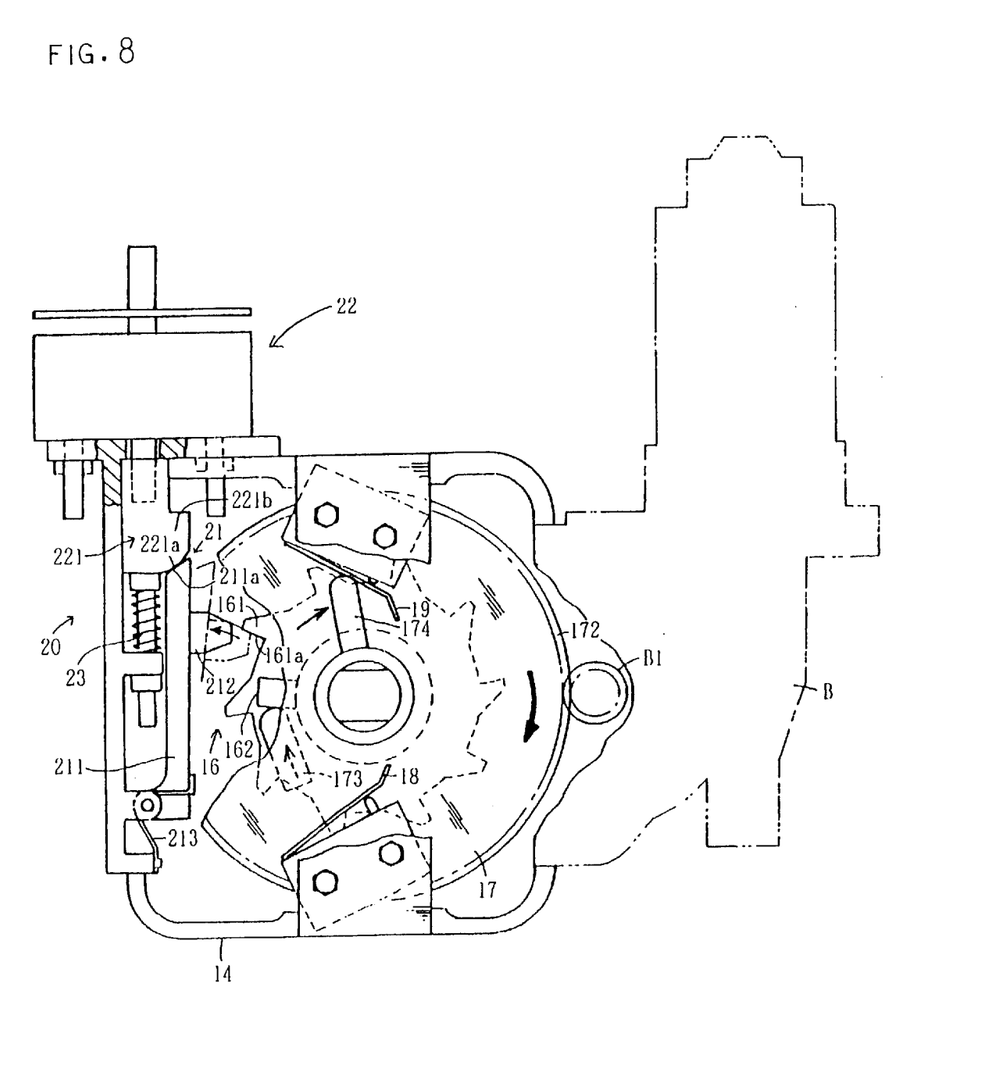
FIG. 8 is a brief plan view showing the rotation mechanism of the upper part stem sectioning a part of thereof.

Then, the engagement between the hitching projection 161 of the first disc member 16 and the engaging member 212 of the lever 211 is released and disengaged, and as shown in FIG. 8, the first disc member 16 rotates slightly in a counterclockwise direction with the spiral spring 15 of the upper part stem 3 to which the first disc member 16 is fixed, so as to bring about such a state that the rear surface of the engaging member 162 hitches the front surface of the engaging member 173 of the second disc member 17. At the time, since the rotation force of the first disc member 16 due to the spiral spring 15 of the upper part stem 3, is smaller in comparison with the rotation force of the gear B1 of the motor B, the first disc member 16 never rotate the second disc member 17 against the power of the motor B.

With the presee of the second limit switch 19 by the limit switch pressing member 174 of the second disc member 17, the second limit switch 19 transmits a signal the motor B, and the motor B truns the direction of rotation of the gear B1. According to the reverse of rotation of the gear B1, the second disc member 17 gearing the gear B1 turns its direction of rotation.

The first disc member 16 rotates together with the second disc member 17 while keeping the state that the rear surface of the engaging projection 162 engages with the front surface of the engaging member 173.

Figure 9:
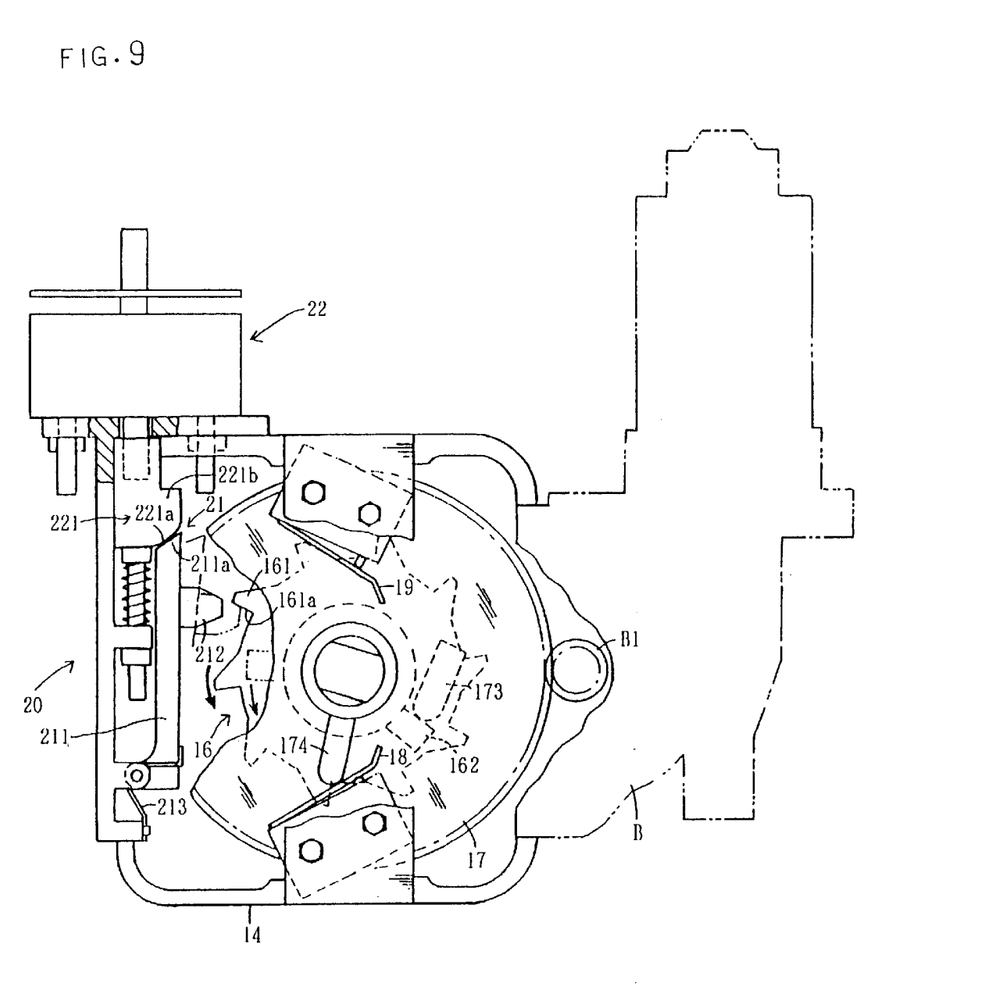
FIG. 9 is a brief plan view showing the rotation mechanism of the upper part stem sectioning a part of thereof.

When the second disc member 17 returns its original position, namely a solid line in FIG. 9, the limit switch pressing member 174 presses the first limit switch 18. Then, the first limit switch transmits a signal to the motor B so as to stop the motor B, and the second disc member 17 gearing the gear B1 of the motor B stands its waiting position. The first disc member 16 also stands its position, namely in its original position that the rear surface of the engaging projection 162 contacts the front surface of the engaging member 173 of the second disc member 17, and stands ready for the next valve opening operation (FIG. 9).

Thus, when the first disc member 16 returns its original position, it keeps a state that the engaging projection 162 engages with the engaging member 173 of the second disc member 17, and rapid rotation or return of the first disc member 16 due to the spiral spring 15 of the upper part stem 3 is controlled with the power of the motor B which rotates the second disc member 17. The first disc member 16 rotates gently and returns with the motor B against the rapid returning force of the spiral spring 15. Therefore, the upper part stem 3 integral with the first disc member 16 rotates according to the rotation and return to the original position of the first disc member 16, and with the rotation of upper part stem 3, the lower part stem 4 moves upwardly via the multi-threaded female and male screws 41a and 32a which are screwed each other, so that the valve member 6 may contact the valve seat 5c of the gas inlet member 5 with the upper half globular surface by metal to metal contact, so as to close the gas inlet 7. As mentioned above, since the first disc member 16 rotates gently and returns with the motor B, it may carry out gently the press of the valve member 6 to the valve seat 5c, and as the result, it may evade break of the valve member 6 and valve seat 5c with inadvertent shock, and prevent an inadvertent situation that due to an occurrence of vibration a bad affection is giving to other devices or elements of the vehicle.

In the opening state of valve, where a traffic accident happens with the vehicle in an emergent situation, the solenoid 22 of the lock mechanism 20 is operated to be in a non-current state instantaneously, and the operation rod 221 is moved rearwardly with the pressure of the spring 23, so as to move its head portion 221b away from the lever 211 and then rotate the lever 211 in an inward direction of the box 14 with the force of the spring 213, namely a direction that the engaging member 212 of the lever 211 is moved away from the engaging projection 161 of the first disc member 16.

Thus, the engagement between the hitching projection 161 of the first disc member 16 nd the engaging member 212 of the lever 211 may be released or disengaged, and the first disc member 16 rotates in a counterclockwise direction in FIG. 7, with the force of the spiral spring 15 of the upper part stem 3 to which the first disc member is fixed, so as to return its original position, as shown in FIG. 9.

At the time, where the first disc member 16 tends to rotate in a counterclockwise direction in integral with the upper part stem 3, since the engaging member 173 of the second disc member 17 stands ready for a position remote away from the engaging projection 162 of the first disc member 16, the rotation force of the first disc member is never transmitted to the second disc member 17. Therefore, the first disc member 16 instantenuously rotates together with the upper part stem 3 with the spiral spring 15 in a counterclockwise direction so as to move the lower part stem 4 upwardly, and with restoring force of the spring 10 the valve member 6 is lifted up via the cylindrical connecting member 8. Then, the upper half globular surface of the valve member 6 is contacted with the valve seat 5c of the gas inlet member 5 under pressure, so as to close the gas inlet completely. The upper end portion of the cylindrical connecting member 8 may be relatively shiftable in a lateral direction with respect to the penetrating opening 43a of the hanging support member 43, and therefore where a strain occurs in the screw engagement between the female screw portion 32a of the upper part stem 3 and the male screw portion 41a of the lower part stem 4, the strain may be absorbed by a clearance between the penetrating opening 43a and the cylindrical connecting member 8, and never transmitted to the cylindrical connecting member 8. As the result, pressing contact of the valve member 6 to the lower opening portion of the gas inlet 7 with the spring 10, becomes even so as to close the gas inlet 7, completely.

Since the closing operation of the valve can be carried out instantaneously at the same time that the electric current is cut to the solenoid 22 without any affection to the load of the motor, it becomes possible to close the valve smoothly and quickly in case that the electric current is cut in an emergency. Further, where the vehicle is burnt due to a traffic accident, the fusible aooly 26 embedded in the upper portion of the valve body 1, is fused with its heat and the break plate 27 is broken with expansion of the gas in the gas container A due to its heat, so that the escaping passages 29 and 30 may be communicated with the outside of the container A directly, and then the gas in the gas container A may be discharged rapidly to the outside of the container.

For example, in case that a part of the valve body 1, projecting from the gas container A towards the outside, is scattered and disappears due to an accident while driving, the gas does not leak from the gas container A inadvertently according to the gas supply valve for the gas-power vehicle mentioned above, the spy, as mentioned above, the spring 10 is mounted under pressure beneath the lower part stem 4, and the upper and lower part stems 3 and 4 are always urged upwardly. Further, where the part projecting outwardly of the gas container A of the valve body 1 disappears, the ring-like stopper 13 also disappears, so that the upper part opening 2a is opened with its upper end to make it possible that the upper and lower part stems 3 and 4 are shiftable in upwards. Therefore, the upper and lower part stems 3 and 4 may be shifted upwardly with the force of the spring 10 which is mounted beneath the lower part stem 4 under pressure, and the valve member 6 connected to the lower part stem 4 via the cylindrical connecting member, is also lifted up and its upper hald globular surface may contact the valve seat 5c of the gas inlet member so as to close the gas inlet 5 surely and the gas of the gas container A does not leak to the outside inadvertently. Further, since the O-ring is fixed to the periphery of the upper end portion of the lower part stem 4, and the clearance between the periphery of the lower part stem 4 and the inside periphery of the lower portion opening 2b of the vertical stem opening 2 facing the periphery of the lower part stem 4, is filled up with the O-ring 41b, the gas left in the gas inlet space 9 does not leak to the outside inadvertently.

Furthermore, in an accident while driving, for example, in case that the upper portion from the first disc member 16 disappears in a state that the valve member 6 opens the gas inlet 7, the gas does not leak inadvertently front he gas container A, according to the gas supply valve for the gas-power vehicle of this invention. Namely, as mentioned above, since the spiral spring 15 is disposed integrally at the upper end portion of the upper part stem 3 and the upper part stem 3 is always urged in a direction for closing the gas inlet 7 by the valve member 6, in the case that the upper portion from the first disc member 16 disappears, the upper part stem 3 rotates immediately in a direction for closing the gas inlet 7 by the valve member 6, so that the gas inlet 7 may be surely closed by means of the valve member 6, and the gas in the gas container A does not leak to the outside inadvertently. Further, since the screwed portion between the upper part stem 3 and the lower part stem 4 is constructed by multi-threaded screws, the upper part stem 3 may be rotated and urged in a direction for closing the gas inlet 7 by the valve member 6 by pressing the lower part stem 4 upwardly with the gas pressure of the gas container A, and by assisting the rotation of the upper part stem 3 with the spiral spring 15. As the result, rotation of the upper part stem 3 may be carried out smoothly andsurely, so that the gas inlet 7 may be rapidly and surely closed by means of the valve member 6.

What is claimed is:

1. A gas supply valve for a gas-powered vehicle comprising a valve body having a vertical stem opening, a gas inlet member fixed to a lower end of the vertical stem opening to communicate with a gas container, an upper part stem slidably and rotatably inserted into the vertical stem opening on an upper side of the gas inlet member, a lower part stem slidably inserted into the vertical stem opening on the upper side of the gas inlet member to move up and down according to a rotation of the upper part stem, a valve member disposed in the lower portion of the gas inlet member for opening and closing the lower end of the opening of the gas inlet member with the up and down movements of the lower part stem, said valve member being urged with a spring force in a direction to close the gas inlet, a gas flow passage formed between the periphery of the lower part stem and the inner peripheral surface of the vertical stem opening to communicate the gas inlet and a gas supply passage formed in the valve body, a ring-like seal member mounted onto the lower end portion of the upper part stem to contact an inside peripheral surface of the upper portion of the vertical stem opening with the peripheral surface of the ring-like seal member under pressure, a ring-like stopper fixed to the upper opening portion of the vertical stem opening for receiving the upper end surface of the ring-like seal member with the under surface of the ring-like stopper, and an O-ring fixed to the peripheral surface of the upper end portion of the lower part stem to contact with the inside peripheral surface of the vertical stem opening under pressure for filling up a clearance between the peripheral surface of the lower part stem and the inside peripheral surface of the vertical stem opening.

2. The gas supply valve for a gas-powered vehicle as claimed in claim 1, further comprising multi-threaded screw means for connecting the lower end portion of the upper part stem and the upper part portion of the lower part stem, wherein the upper part stem is urged in a direction of rotation by pressing the lower part stem upwardly.

3. The gas supply valve for a gas-powered vehicle as claimed in claim 1, further comprising a rotation mechanism for the upper part stem, said rotation mechanism including:

a spring for urging the upper part stem in a direction that the valve member closes the gas inlet of the gas inlet member, a first disc member provided with the upper end portion of the upper part stem integrally and having a hitch projection with the periphery thereof and an engaging projection with the upper surface thereof, a second disc member having an engaging projection with the lower surface thereof to engage with the engaging projection of the first disc member, a motor for driving the second disc member, a lock mechanism provided with a solenoid for disengagably engaging with the hitch projection of the first disc at a time that the gas inlet of the gas inlet member becomes in the opening state due to the down movement of the lower part stem by rotating the upper part stem against the spring with the rotation of the first disc member, a first limit switch for stopping the motor, and a second limit switch for changing a direction of rotation of the motor for driving the second disc member.

4. The gas supply valve for a gas-powered vehicle as claimed in claim 2, further comprising a rotation mechanism for the upper part stem, said rotation mechanism including:

a spring for urging the upper part stem in a direction that the valve member closes the gas inlet of the gas inlet member, a first disc member provided with the upper end portion of the upper part stem integrally and having a hitch projection with the periphery thereof and an engaging projection with the upper surface thereof, a second disc member having an engaging projection with the lower surface to engage with the engaging projection of the first disc member, a motor for driving the second disc member, a lock mechanism provided with a solenoid for disengagably engaging with the hitch projection of the first disc at the time that the gas inlet of the gas inlet member becomes in the opening state due to the down movement of the lower part stem by rotating the upper part stem against the spring with the rotation of the first disc member, a first limit switch for stopping the motor, and a second limit switch for changing a direction of rotation of the motor for driving the second disc member.

5. A gas supply valve for a gas-powered vehicle comprising a valve body having a vertical stem opening, a gas inlet member fixed to a lower end of the vertical stem opening to communicate with a gas container, an upper part stem slidably and rotatably inserted into the vertical stem opening on an upper side of the gas inlet member, a lower part stem slidably inserted into the vertical stem opening on the upper side of the gas inlet member to move up and down according to a rotation of the upper part stem, a valve member disposed in the lower portion of the gas inlet member for opening and closing the lower end of the opening of the gas inlet member with the up and down movements of the lower part stem, said valve member being urged with a spring force in a direction to close the gas inlet, a gas flow passage formed in the lower part stem to communicate its upper end opening with a gas supply passage formed in the valve body and communicate its lower opening with the gas inlet as the lower part stem moves down, a ring-like seal member mounted onto the lower end portion of the upper part stem to contact the inside peripheral surface of the upper portion of the vertical stem opening with the peripheral surface of the ring-like seal member under pressure, a ring-like stopper fixed to the upper opening portion of the vertical stem opening for receiving the upper end surface of the ring-like seal member with the under surface of the ring-like stopper.

* * * * *

UNITED STATES PATENT AND TRADEMARK OFFICE
CERTIFICATE OF CORRECTION

PATENT NO.   : 6,039,300
DATED        : March 21, 2000
INVENTOR(S)  : Risuke Takamatsu & Seiichi Kimura It is certified that error appears in the above-identified patent and that said Letters Patent is hereby corrected as shown below:

Title Page
Delete " [73] Assignee: Robert Bosch GmbH, Stuttgart, Germany" and insert
-- [73] Kabushiki Kaisha Mutsumi Kosei Osaka, JAPAN --.

Signed and Sealed this

Twenty-fourth Day of July, 2001

Attest:

NICHOLAS P. GODICI
Attesting Officer    Acting Director of the United States Patent and Trademark Office